(12) United States Patent
Yan et al.

(10) Patent No.: US 8,895,764 B2
(45) Date of Patent: *Nov. 25, 2014

(54) ZNO NANOPARTICLE CATALYSTS FOR USE IN BIODIESEL PRODUCTION AND METHOD OF MAKING

(75) Inventors: Shuli Yan, Detroit, MI (US); Steven O. Salley, Grosse Pointe Park, MI (US); K. Y. Simon Ng, West Bloomfield, MI (US)

(73) Assignee: Wayne State University, Detroit, MI (US)

(*) Notice: Subject to any disclaimer, the term of this patent is extended or adjusted under 35 U.S.C. 154(b) by 929 days.

This patent is subject to a terminal disclaimer.

(21) Appl. No.: 12/485,433

(22) Filed: Jun. 16, 2009

(65) Prior Publication Data

US 2009/0307966 A1 Dec. 17, 2009

Related U.S. Application Data

(63) Continuation-in-part of application No. 12/468,309, filed on May 19, 2009, now Pat. No. 8,163,946.

(60) Provisional application No. 61/054,205, filed on May 19, 2008.

(51) Int. Cl.
*C07C 51/00* (2006.01)
*C11C 1/00* (2006.01)
(Continued)

(52) U.S. Cl.
CPC *B01J 23/06* (2013.01); *B01J 37/08* (2013.01); *C11C 3/003* (2013.01); *Y02E 50/13* (2013.01);
(Continued)

(58) Field of Classification Search
CPC ........ B01J 35/0006; B01J 23/10; B01J 23/06; B01J 35/023; B01J 35/002; B01J 35/006; B01J 37/031; B01J 37/08; C11C 3/003; C10L 1/026; Y02E 50/13
USPC .................................................. 502/303, 343
See application file for complete search history.

(56) References Cited

U.S. PATENT DOCUMENTS 4,161,463 A 7/1979 Myers et al.
5,354,878 A 10/1994 Connemann et al.
(Continued)

FOREIGN PATENT DOCUMENTS

CN 1 966 142 5/2007
DE 3932514 A1 4/1991
(Continued)

OTHER PUBLICATIONS

Bancquart, Sebastian, Céline Vanhove, Yannick Pouilloux, Joël Barrault, "Glycerol transesterification with methyl stearate over solid basic catalysts: I. Relationship between activity and basicity," vol. 218, Issues 1-2, (Sep. 25, 2001), pp. 1-11.*

(Continued)

*Primary Examiner* — Anthony J Zimmer
(74) *Attorney, Agent, or Firm* — Brinks Gilson & Lione (57) ABSTRACT

A method of forming a biodiesel product and a heterogeneous catalyst system used to form said product that has a high tolerance for the presence of water and free fatty acids (FFA) in the oil feedstock is disclosed. This catalyst system may simultaneously catalyze both the esterification of FAA and the transesterification of triglycerides present in the oil feedstock. The catalyst system is comprised of a mixture of zinc oxide and a second metal oxide. The zinc oxide includes a mixture of amorphous zinc oxide and zinc oxide nanocrystals, the zinc nanocrystals having a mean grain size between about 20 and 80 nanometers with at least one of the nanocrystals including a mesopore having a diameter of about 5 to 15 nanometers. Preferably, the second metal oxide is a lanthanum oxide, the lanthanum oxide being selected as one from the group of $La_2CO_5$, $LaOOH$, and combinations or mixtures thereof.

18 Claims, 8 Drawing Sheets

(51) Int. Cl.

| | | |
|---|---|---|
| *C11C 3/00* | (2006.01) | |
| *B01J 23/00* | (2006.01) | |
| *B01J 23/10* | (2006.01) | |
| *B01J 23/02* | (2006.01) | |
| *B01J 23/44* | (2006.01) | |
| *B01J 37/08* | (2006.01) | |
| *B01J 23/06* | (2006.01) | |
| *B01J 35/00* | (2006.01) | |
| *C10L 1/02* | (2006.01) | |
| *B01J 37/03* | (2006.01) | |
| *B01J 35/02* | (2006.01) | |

(52) U.S. Cl.
CPC ............... *B01J 35/002* (2013.01); *C10L 1/026* (2013.01); *B01J 35/006* (2013.01); *B01J 23/10* (2013.01); *B01J 37/031* (2013.01); *B01J 35/023* (2013.01)
USPC ..................... 554/169; 502/303; 502/343

(56) References Cited

U.S. PATENT DOCUMENTS

| | | | |
|---|---|---|---|
| 5,525,126 | A | 6/1996 | Basu et al. |
| 5,908,946 | A | 6/1999 | Stern et al. |
| 6,147,196 | A | 11/2000 | Stern et al. |
| 6,211,390 | B1 | 4/2001 | Peter et al. |
| 6,359,157 | B2 | 3/2002 | Peter et al. |
| 6,730,309 | B2 * | 5/2004 | Horino ............. 424/401 |
| 7,396,962 | B1 | 7/2008 | Dubois et al. |
| 2003/0195367 | A1 | 10/2003 | Barrault et al. |
| 2007/0161828 | A1 | 7/2007 | Kibino et al. |
| 2008/0214880 | A1 | 9/2008 | Dubois et al. |

FOREIGN PATENT DOCUMENTS

| | | |
|---|---|---|
| DE | 4123928 A1 | 1/1993 |
| DE | 4209779 C1 | 7/1993 |
| FR | 2 866 653 | 8/2005 |
| FR | 2882052 A1 | 8/2006 |
| FR | 2882053 A1 | 8/2006 |
| JP | 2006-104316 A | 6/2006 |
| JP | 2008-274030 A | 11/2008 |
| WO | WO 2005/116168 | 12/2005 |
| WO | WO 2008/012275 A1 | 1/2008 |
| WO | WO 2008/041038 | 4/2008 |

OTHER PUBLICATIONS

Babu, N. Seshu et al., "Room-Temperature Transesterification of Edible and Nonedible Oils Using a Heterogeneous Strong Basic Mg/La Catalyst," Energy & Fuels, 2008, vol. 22, pp. 1965-1971.

Kawashima, Ayato et al., "Development of heterogeneous base catalysts for biodiesel production," Bioresource Technology, vol. 99, 2008, pp. 3439-3443.

Li, Xu et al., "A novel solid superbase of $Eu_2O_3/Al_2O_3$ and its catalytic performance for the transesterification of soybean oil to biodiesel," Catalysis Communications, 8, 2007, pp. 1969-1972.

International Search Report and Written Opinion of PCT/US2009/044528.

"Simultaneous Transesterification and Esterification of Unrefined or Waste Oils Over $ZnO-La_2O_3$ Catalysts," by Shuli Yan et al., Applied Catalysis A: General, 353 (2009) pp. 203-212.

* cited by examiner

ZNO NANOPARTICLE CATALYSTS FOR USE IN BIODIESEL PRODUCTION AND METHOD OF MAKING

The present patent document is a continuation-in-part of application Ser. No. 12/468,309, filed May 19, 2009, now U.S. Pat. No. 8,163,946 which claims the benefit of the filing date under 35 U.S.C. §119(e) of Provisional U.S. Patent Application Ser. No. 61/054,205, filed May 19, 2008. All of the foregoing applications are hereby incorporated by reference in their entirety.

FEDERALLY SPONSORED RESEARCH AND DEVELOPMENT

This invention was made with government support under Contract No. DEFG36-05G085005 awarded by the U.S. Department of Energy. The U.S. government may retain certain rights to the invention.

FIELD

This invention relates generally to biodiesel products. More specifically, this invention pertains to heterogeneous catalysts and methods of preparing such catalysts having high activity and long lifetime when used to form a biodiesel product.

BACKGROUND

Biodiesel, which is a renewable fuel that has similar combustion properties to fossil diesel, is normally produced by the transesterification of highly refined oils with short-chain alcohols. Since biodiesel can significantly decrease the emission of $CO_2$, $SO_x$, and unburned hydrocarbons from the exhaust of motor vehicles, it is environmentally beneficial, and therefore, a promising alternative to fossil diesel.

Biodiesel is typically produced in a conventional manufacturing operation from the catalyzed transesterification reaction of triglyceride. In this reaction the oil or fat is reacted with an alcohol to form the biodiesel and glycerin. Such a conventional operation will usually use a strong basic (e.g., NaOH or KOH) or acidic (e.g., $H_2SO_4$) solution as a homogeneous catalyst and food-grade vegetable oils as the raw material. These homogeneous catalysts are quite sensitive to the presence of free fatty acids (FFA) and water in the oil feedstock. FFA is known to react with basic catalysts (i.e., NaOH or KOH) to form soaps. The formation of soaps will subsequently complicate the separation of glycerin from the reaction mixture, thereby, drastically reducing the yield of methyl esters.

The presence of water in the oil feedstock will also lead to the hydrolysis of the oils and fatty acid methyl esters (FAME) when a strong basic or acidic catalyst is present. Thus, inexpensive oils, such as crude vegetable oils, waste cooking oil, and other rendered animal fats, that generally contain a high content of FFA and water cannot be directly utilized in a conventional process.

The FFA content in the oil feedstock used in a conventional process with a homogenous catalyst should be less than about 0.5 weight percent, while the water content should be less than about 0.06 weight percent. For this reason, highly refined oils are normally preferred for use in a conventional process for biodiesel production. The cost of the oil feedstock used in a conventional process can account for 80% or more of the total cost incurred in producing the biodiesel product. The development of new catalysts that could be directly used with unrefined and waste oils would be advantageous in that it would lower the manufacturing cost for the biodiesel product.

An acid- and alkali-catalyzed two-step method for biodiesel production that may use a small amount of unrefined or waste oils as a raw material is known. In this two-step method, an acidic catalyst ($H_2SO_4$, HCl) is initially used to convert FFA to various esters in the first step. Then in the second step, the transesterification of oil is performed using an alkaline catalyst, i.e., NaOH or KOH. Although this method of producing biodiesel may utilize some unrefined or waste oils, the process requires multiple reactions, washing, and product separation operations, and is not an environmentally benign process. For example, the strong acidic and basic catalysts used in this process are highly corrosive and will need to be removed from the biodiesel product through multiple washing steps. Since this two-step production process results in the generation of a significant amount of waste water and a continual loss of catalyst, it actually increases the production cost for a biodiesel product. Thus there continually exists a need and desire to develop new catalysts that can be made cost effectively and that will exhibit high reactivity over a long period of time when used in the production of a biodiesel product.

SUMMARY

The present invention provides a method of forming a biodiesel product from unrefined or waste oils. The method includes preparing a heterogeneous catalyst system that comprises a nanoparticle mixture of zinc oxide and a second metal oxide. An unrefined oil feedstock and an alcohol are then placed in contact with the catalyst system to form a reaction mixture. The reaction mixture includes a combination of triglycerides, alcohol, free fatty acids in a concentration that is greater than about 0.5 wt. %, and water in a concentration that is greater than about 1 wt. %. The reaction mixture is heated to a temperature between about 170° C. and 220° C. in order to cause the transesterification of triglycerides in the oil feedstock and the esterification of fatty free acids in the oil feedstock to simultaneously occur. The reaction is allowed to proceed for a predetermined amount of time to form fatty acid methyl esters and result in a biodiesel product. Finally, the catalyst is separated from the biodiesel product in order to collect the biodiesel product.

According to another aspect of the present invention, a novel heterogeneous catalyst system used for the production of a biodiesel product from unrefined or waste oils is described. The catalyst system comprises a mixture of zinc oxide and a second metal oxide. The zinc oxide includes a nanoparticle mixture of amorphous zinc oxide and zinc oxide nanocrystals, the zinc nanocrystals having a mean grain size between about 20 and 80 nanometers with at least one of the nanocrystals including a mesopore having a diameter of about 5 to 15 nanometers. Preferably, the second metal oxide is a lanthanum oxide, the lanthanum oxide being selected as one from the group of $La_2CO_5$, LaOOH, and combinations or mixtures thereof. The combination of zinc oxide and lanthanum oxide may have a Zn:La bulk molar ratio between about 9.0:1.0 and 1.0:1.0. The catalyst exhibits a first surface site and a second surface site, the first surface site capable of catalyzing the transesterification reaction of triglyceride with an alcohol and the second surface site capable of catalyzing the esterification reaction of a fatty acid with an alcohol.

Another objective of the present disclosure is to provide a method of preparing the heterogeneous catalyst system. This method comprises combining together in a predetermined ratio, $Zn(NO_3)_2$ and $M(NO_3)_x$, to form a first aqueous solution, where M is a second metal and x is an integer between 1 and 3; mixing the first aqueous solution with an aqueous urea solution to form a mixed solution; agitating and applying heat to the mixed solution for a predetermined length of time; stopping the agitation of the mixed solution after a substantial amount of solid precipitate forms in the mixed solution; continuing to heat the mixed solution until the solution becomes a firm solid; drying the firm solid at a temperature greater than about 100° C. for a period of time of at least about 1 hour; and calcining the solid at an elevated temperature for a predetermined length of time to obtain a heterogeneous catalyst system having a composition as described above.

According to another aspect of the present disclosure, the transesterification reaction proceeds to form the fatty acid methyl esters with greater than about a 90% yield. This high yield of fatty acid methyl esters is obtained after a period of time in which the amorphous zinc oxide and second metal oxide of the catalyst system partially leach into the reaction mixture. The leaching of the amorphous zinc oxide and second metal oxide into the reaction mixture exposes the surface of the zinc nanocrystals in the catalyst system to the reaction mixture.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the description and drawings, corresponding reference numerals indicate like or corresponding parts and features.

The present invention generally provides a heterogeneous catalyst system that has a high tolerance to the presence of water and free fatty acids (FFA) in the oil feedstock used to prepare a biodiesel product. This catalyst system may simultaneously catalyze both the esterification of FAA and the transesterification of triglycerides present in the oil feedstock. The catalyst system according to one embodiment of the present disclosure represent a class of zinc oxide heterogeneous catalysts that include different ratios of zinc oxide to a second metal (M) oxide (Zn:M ratio) ranging from about 9:1 to 1:1. The Zn:M ratio in the catalyst is believed to have an effect on the number and reactivity of Lewis acid and base sites, as well as the transesterification of glycerides, the esterification of fatty acids, and the hydrolysis of glycerides and biodiesel. The zinc oxide in the catalyst represents a nanoparticle mixture of amorphous zinc oxide and zinc oxide nanocrystals, where at least one of the nanocrystals includes a mesopore having a diameter of about 5 to 15 nanometers.

Preferably the second metal (M) oxide is a mixture of lanthanum oxides. The mixture of lanthanum oxides may be selected as one from the group of $La_2CO_5$, LaOOH, and combinations or mixtures thereof. A catalyst composition that is particularly preferred for use in a reaction to form a biodiesel product includes a combination of zinc and lanthanum oxides that have a Zn:La bulk molar ratio between about 1.0:1.0 (Zn1La1) and 4.0:1:0 (Zn4La1). However, other catalyst compositions including but not limited to combinations of zinc and lanthanum oxides having Zn:La bulk molar ratios less than or equal to about 9.0:1.0 may be used.

The homogeneous precipitation method for forming the heterogeneous catalyst system as described in co-pending U.S. patent application Ser. No. 12/468,309, filed May 19, 2009, the entirety of which is incorporated herein, involves the use of multiple steps. These steps may include the precipitation of a metal oxide mixture from a stirred solution of $Zn(NO_3)_2$, $M(NO_3)_x$, and urea followed by separating the precipitated metal oxide precursors from the liquid phase by filtration, washing the metal oxide precursors with distilled water, drying the "wet" metal oxide precursors, and finally calcining the metal oxide precursors at an elevated temperature to form the metal oxide catalyst. In such a homogeneous precipitation process, many variables and parameters need to be monitored and controlled. These parameters include, but are not be limited to, the concentration of the precursor solutions, the stirring rate or agitation speed, the temperatures associated with the various phases of the process (e.g., precipitation, filtering, water washing, drying, and calcination phases), the pH value exhibited by the precursor solutions, the volume of wash water utilized, and the reaction time associated with the precipitation of the metal oxide precursors.

Figure 1:
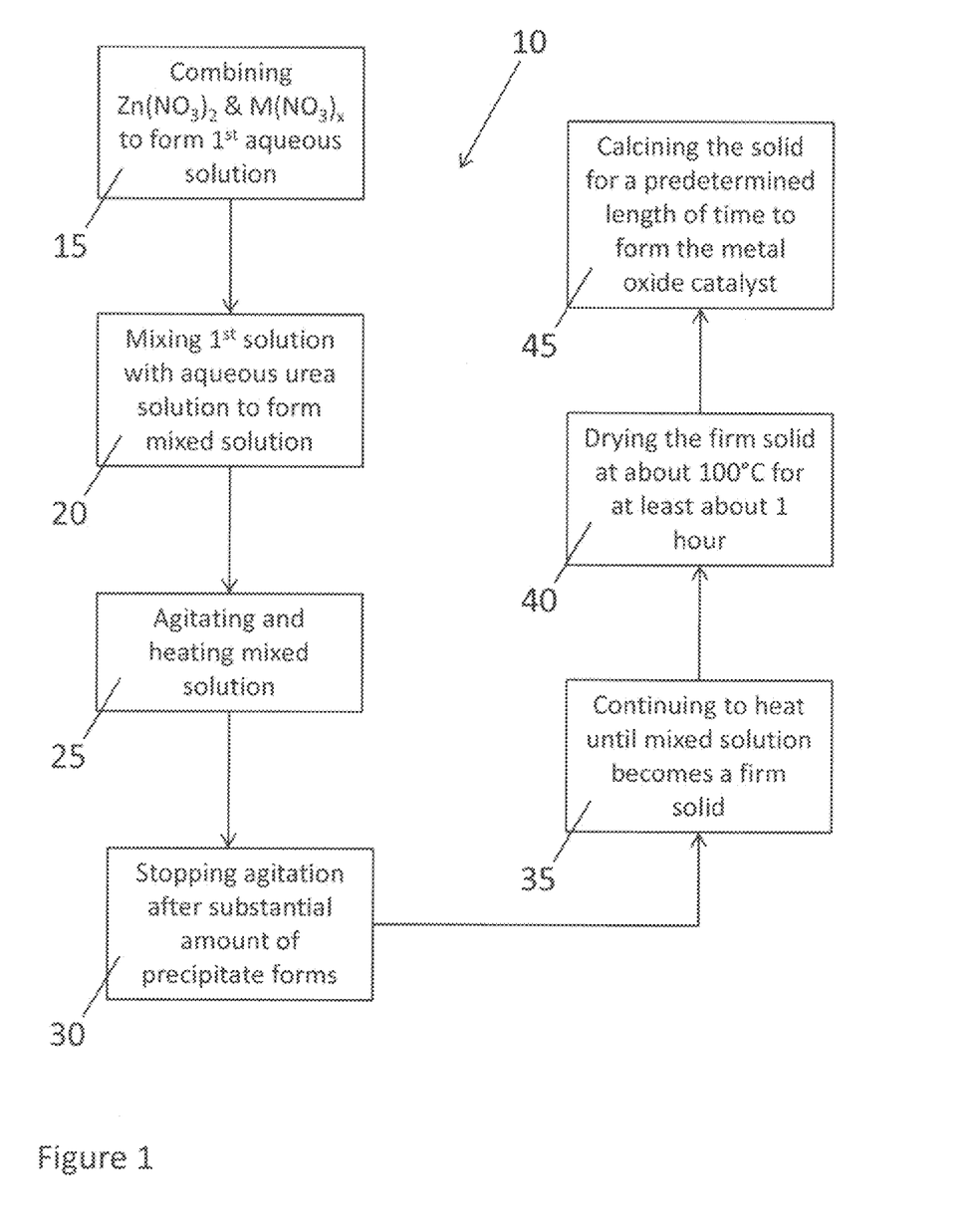
FIG. 1 is a flowchart describing a method for making a heterogeneous catalyst system according to one embodiment of the present disclosure.

In comparison to a homogeneous precipitation method, the simplified method for preparing the metal oxide catalyst system of the present disclosure eliminates multiple process steps and the need to monitor or control several different process variables. More specifically, the simplified method 10 of the present disclosure as shown in FIG. 1 involves combining 15 together a predetermined ratio of $Zn(NO_3)_2$ and $M(NO_3)_x$, where M is a second metal and x is an integer between 1 and 3, to form a first aqueous solution; mixing 20 the first aqueous solution with an aqueous urea solution to form a mixed solution; agitating and applying 25 heat to the mixed solution for a predetermined length of time; stopping 30 the agitation of the mixed solution after a substantial amount of solid precipitate forms in the mixed solution; continuing 35 to heat the mixed solution until the solution becomes a firm solid in the reaction vessel; drying 40 the firm solid at a temperature greater than about 100° C. for a period of time of at least about one hour; and finally calcining 45 the dried solid at an elevated temperature for a predetermined length of time to form the metal oxide catalyst system. In this simplified process 10, only the stirring rate or agitation speed of the solution and the temperatures associated with the precipitation, drying, and calcination stages represent the parameters that should be monitored and controlled.

The step of calcining 45 the dried solid is preferably done at a temperature of at least about 450° C. for a period of time that is about 10 hours or more. Upon calcination, the volume of the metal oxide catalyst system may increase by an order of magnitude, i.e., about a ten-fold increase. Although the volume of the catalyst will increase, the weight of the firm solid will decrease during the calcination step by about 80%, thereby, resulting in a lighter metal oxide catalyst system. This decrease in weight is believed to be due to the volatilization and combustion of organic residues and impurities that are present in the firm solid after the drying step.

The simplified method 10 of the present disclosure results in a metal oxide catalyst system that comprises zinc oxide and a second metal oxide. Although one skilled-in-the-art will understand that the second metal oxide may include any known or desirable metal oxide that may act as a catalyst for the formation of a biodiesel product, the second metal oxide is preferably a mixture of lanthanum oxides.

Figure 2A:
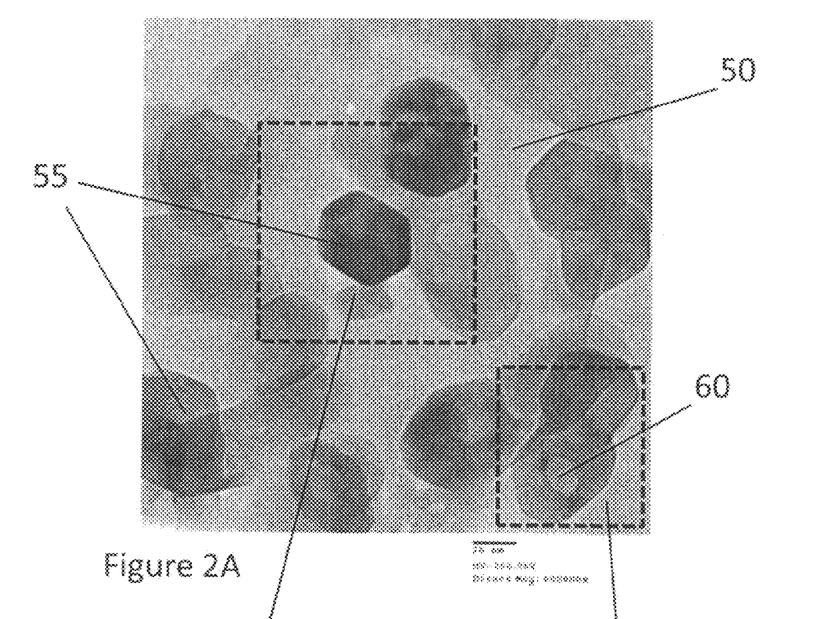
FIG. 2A is a micrograph from transmission electron microscopy (TEM) that shows the structure of the zinc oxide present in a catalyst system prepared according to the teachings of the present disclosure.
Figure 2B:
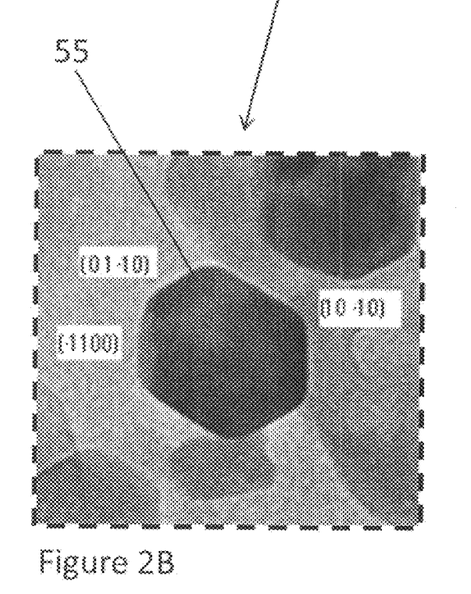
FIG. 2B is a micrograph showing a zinc oxide nanocrystal from the catalyst composition of FIG. 2A.
Figure 2C:
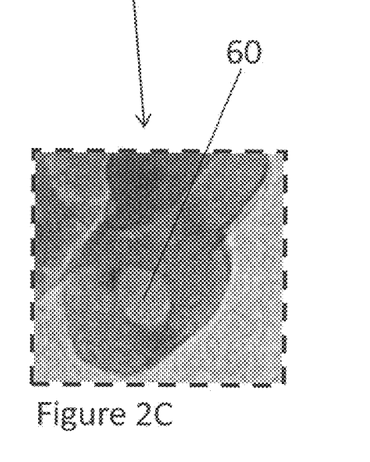
FIG. 2C is a micrograph showing a zinc oxide nanocrystal with a mesopore from the catalyst composition of FIG. 2A.

Referring to FIGS. 2A-2C, the zinc oxide is shown by transmission electron microscopy (TEM) to include a mixture of amorphous zinc oxide 50 and zinc oxide nanocrystals 55. The zinc oxide nanocrystals 55 have a mean grain size that is between about 20 and 80 nanometers. The average size as depicted in FIGS. 2A and 2B is on the order of about 30 nanometers. At least one of the nanocrystals 55 in the catalyst includes a mesopore 60 that has a diameter between about 5 to 15 nanometers. The mesopore 60 shown in FIG. 2C exhibits a diameter of about 10 micrometers. The presence of a plurality of zinc nanocrystals having a mesopore in the catalyst system is preferred.

The characterization of the zinc and lanthanum metal oxide catalysts of the present disclosure by x-ray diffraction (XRD) and energy dispersive spectrometry (EDS) shows that a mixture of ZnO, $La_2CO_5$, and LaOOH exist in Zn9La1 in the catalyst system. As the lanthanum content increases, a transition from bulk ZnO structures to a mixture of zinc-lanthanum oxide structures occurs. The mean grain size of ZnO is found to decrease with the addition of lanthanum, suggesting that a strong interaction between La and Zn species may enhance the dispersion of ZnO. Mixed ZnO—$La_2O_3$ catalysts have been shown to exhibit higher catalytic activities than pure zinc oxide catalyst (e.g., Zn10La0), which correlates well with the effects of lanthanum on enhancing the dispersion of the ZnO in the catalyst mixture.

A comparison of the crystal structure obtained using x-ray diffraction (XRD) for the zinc oxide nanocrystals 55 prepared according to a homogeneous precipitation method and according to the simplified method 10 of the present disclosure is provided in Table 1. The crystal structure of the zinc oxide nanocrystals 55 prepared according to the simplified method 10 were reexamined after both 18 days and 32 days of use in catalyzing the formation of a biodiesel product. The nanocrystals prepared according to the simplified method 10 exhibits a very stable crystal structure as demonstrated by the minor changes that occurred after 18 days of use and after 32 days of use.

TABLE 1

| Catalyst | Preparation Method | XRD Structure | Mean Grain Size of ZnO crystals (nm) | Lattice Constants for ZnO Phase | | | Density (C) | Zn:La (bulk molar ratio) |
| --- | --- | --- | --- | --- | --- | --- | --- | --- |
| | | | | a (Å) | c (Å) | Vol (Å$^3$) | | |
| Zn9La1 | Homogeneous Precipitation Method | ZnO | 27.6 | 3.25 | 5.36 | 48.62 | 5.56 | 8.9:1.0 |
| Zn3La1 | Homogeneous Precipitation Method | ZnO, $La_2CO_5$ LaOOH | 17.1 | 3.25 | 5.23 | 47.81 | 5.65 | 3.5:1.0 |
| Zn2La1 | Simplified Method 10 (ORIGINAL) | ZnO, $La_2CO_5$ LaOOH | 15.5 | 3.22 | 5.18 | 46.40 | 5.83 | 2.0:1.0 |
| Zn2La1 | Simplified Method 10 (AFTER 18 DAYS) | ZnO, $La_2CO_5$ LaOOH | 14.3 | 3.26 | 5.21 | 47.88 | 5.64 | 2.0:1.0 |
| Zn2La1 | Simplified Method 10 (AFTER 32 DAYS) | ZnO, $La_2CO_5$ LaOOH | 14.2 | 3.26 | 5.26 | 48.35 | 5.58 | 2.0:1.0 |
| Zn1La1 | Homogeneous Precipitation Method | ZnO, $La_2CO_5$ LaOOH | 9.8 | 3.33 | 5.10 | 49.12 | 5.50 | 1.2:1.0 |

The XRD analysis of the ZnO nanocrystals identified the presence of various polar crystal planes. On these polar crystal planes, the amount of oxygen atoms is not equal to zinc atoms. Thus these crystal faces may exhibit electronic properties and reactant molecules may preferentially adsorb on these polar faces. These polar surfaces are believed to be associated with the active centers for the transesterification and esterification reactions. The presence of the mesopore in a nanocrystal is further believed to be associated with an increase in catalytic activity. One skilled-in-the-art will understand that other explanations may also be plausible.

The catalyst system of the present disclosure may be used to facilitate the transesterification of triglyceride found in an oil feedstock. Triglyceride is typically the major component of vegetable oils. A catalyst composition prepared according to the teachings of the present disclosure has been observed to be capable of continuously used for greater than 80 days in a continuous reactor. The activity and lifetime of the catalyst prepared according to the present disclosure is greater than that associated with conventional biodiesel catalysts. Thus the catalyst composition prepared according to the present disclosure can dramatically lower the costs associated with catalyst preparation and the oil feedstock, thereby, lowering the overall cost of producing a biodiesel product.

Figure 3:
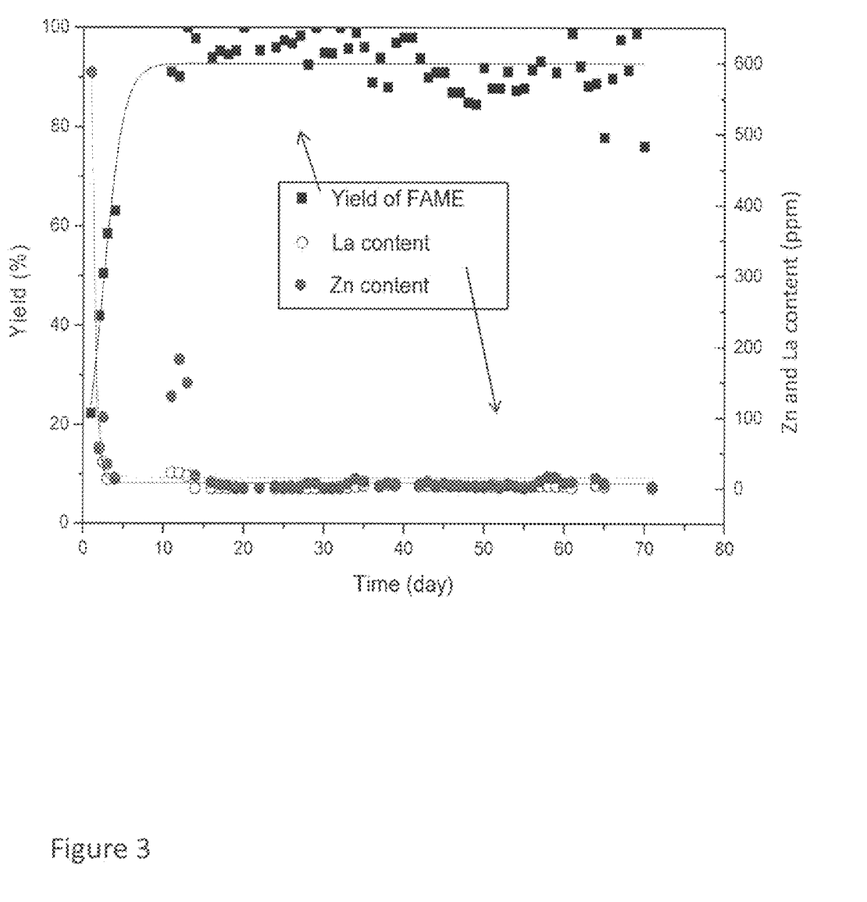
FIG. 3 is a graphical representation of the yield of FAME in a transesterification reaction using a catalyst system prepared according to the teachings of the present disclosure and the amount of zinc and lanthanum that leaches into the FAME plotted as a function of reaction time.

A summary of the catalytic activity associated with a catalyst prepared according to the teachings of the present disclosure for the transesterification of oil is provided in FIG. 3. The yield of fatty acid methyl esters (FAME) over a continuous reaction period of 70 days is shown. Over the initial 6 days of the reaction period, the yield of FAME from the catalyzed reaction continuously increases. Starting on about the $7^{th}$ day, the yield of FAME is observed to stabilize and remain relatively constant at an average yield that is greater than about 90%.

The partial leaching of metals (i.e., Zn and La) from the metal oxide catalyst system into the FAME product was also monitored as shown by FIG. 3. In the first three days of the reaction, the zinc and lanthanum content present in the FAME product was found to be relatively high, e.g., on the order of several hundred parts per million (ppm). However, this level was found to significantly decrease as the reaction period continued. During the $3^{rd}$ day of the reaction period, the zinc content in the FAME product was observed to decrease to a level of about 6 ppm and the lanthanum content to about 2 ppm. This low level for both the zinc and lanthanum content in the FAME product was maintained for the remainder of the 70 day reaction period.

Figure 4:
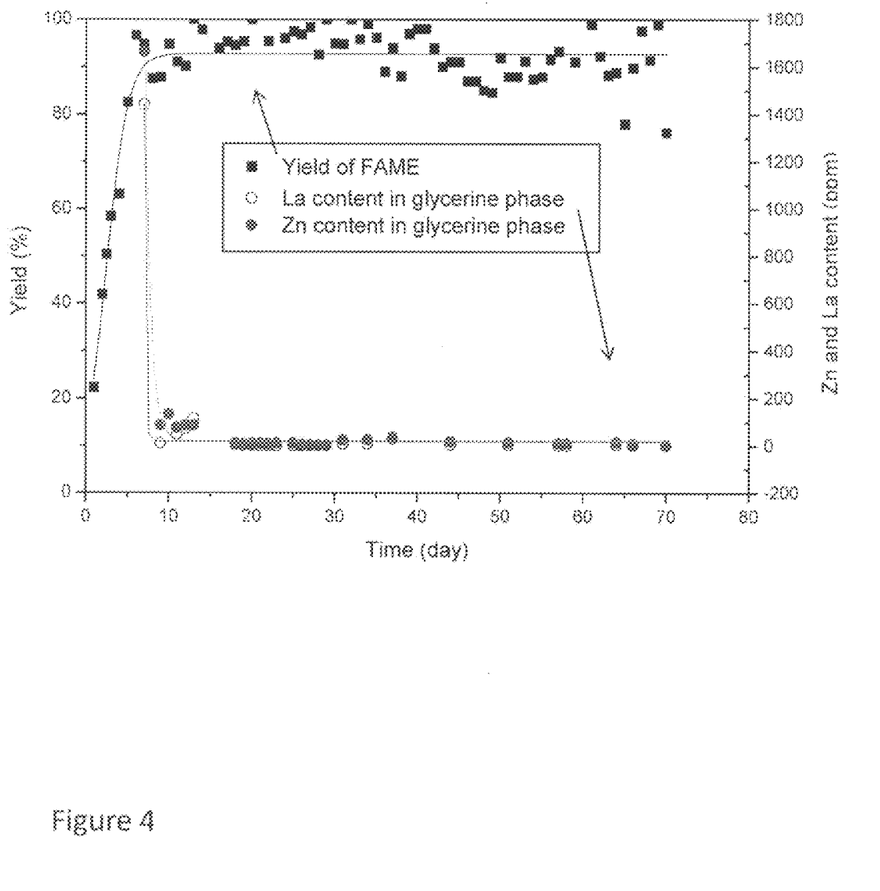
FIG. 4 is a graphical representation of the yield of FAME in a transesterification reaction using a catalyst system prepared according to the teachings of the present disclosure and the amount of zinc and lanthanum that leaches into glycerin formed during the reaction plotted as a function of reaction time.

The partial leaching of the zinc and lanthanum from the metal oxide catalyst system in to the glycerin that is formed during the reaction was also examined as shown in FIG. 4. For about the first seven days of the reaction period, the amount of zinc and lanthanum present in the glycerin was observed to be slightly over 1,000 ppm. However, after the $7^{th}$ day of the reaction period, both the level of zinc and lanthanum in the glycerin was observed to decrease to about 8 ppm and 4 ppm, respectively. This low level of leaching is then maintained for the remainder of the 70 day reaction period. The $7^{th}$ day of the reaction period is also associated with the yield of FAME reaching its highest and maintainable level of greater than about 90%.

Figure 5:
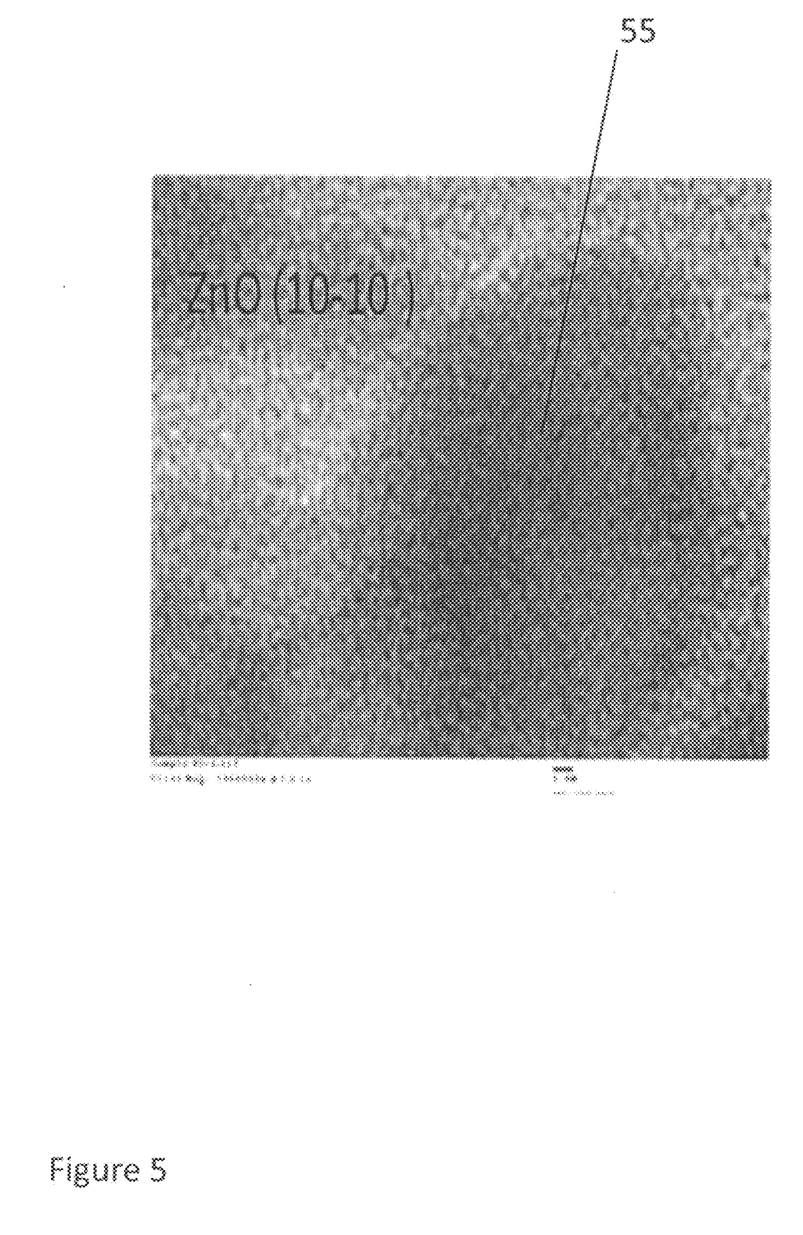
FIG. 5 is a micrograph of a zinc nanocrystal present in the catalyst system prepared according to the teachings of the present disclosure and used to catalyze a transesterification reaction for 32 days.

It is believed that the initial leaching of zinc and lanthanum into the FAME product and glycerin arises from the presence of amorphous material in the metal oxide catalyst system as originally prepared. However, upon the partial removal of this amorphous material (e.g., leaching), the active surfaces associated with the nanocrystals present in the catalyst system become exposed to reaction mixture, resulting in the observed high and stable level of activity for the remainder of the reaction period. Referring to FIG. 5, zinc nanocrystals 55 are observed by transmission electron microscopy (TEM) to remain in the metal oxide catalyst after being used to catalyze the formation of fatty acid methyl esters (FAME) for 32 days. The zinc nanocrystal 55 as shown in the micrograph has a diameter on the order of about 20 nanometers.

A nanoparticle catalyst prepared according to the teachings of the present disclosure will exhibit activity in catalyzing the transesterification reaction when the reaction temperature is higher than about 170° C. When no catalyst is present, the oil transesterification reaction will start at 220° C. Catalysts with a composition between about Zn1La1 and Zn4La1 exhibit the highest activity when compared to other catalyst compositions.

The initial molar ratio of methanol to oil present in the feedstock, as well as the reaction temperature has an effect on the catalyzed transesterification reaction. When the methanol concentration is kept in excess, a power rate law model can be written as shown in Equation 1 where $r_0$ is the initial reaction rate (for <15% FAME yield), $k_1$ is the apparent reaction rate constant, $C_{oil,0}$ is the initial oil concentration, and $\alpha$ is the reaction order. The apparent reaction order for the oil will be about 1.08 and the apparent activation energy, $E_{app}$, about 91.28 KJ/mol. This activation energy is higher than the reported $E_{app}$ using a NaOH catalyst.

$$-\gamma_o = k_1 C_{oil,o}{}^a \qquad \text{Eq. 1}$$

According to another aspect of the present disclosure, the catalyst may simultaneously esterify free fatty acids (FFA) into biodiesel. FFA can be present in a substantial amount in unrefined or waste oils. An example of a free fatty acid whose properties and performance may represent other fatty acids is oleic acid. The esterification of a fatty acid with methanol in the presence of a catalyst is depicted by Equation 2. When the temperature is higher than about 140° C., the heterogeneous catalyst system will begin to exhibit activity in regards to the esterification of FAA. At 200° C., a yield of oleic acid methyl ester in excess of 90% can be obtained.

$$R_1COOH + CH_3OH \xrightleftharpoons{\text{Catalyst}} R_1COOCH_3 + H_2O \qquad \text{Eq. 2}$$

Since a considerable amount of FFA can exist in unrefined or waste oil feedstock, the catalyst system of the present disclosure is capable of esterifying the FFA with methanol in the presence of triglycerides. The esterification reaction will proceed quickly and can occur simultaneously with the transesterification of the triglycerides in the oil.

Figure 6:
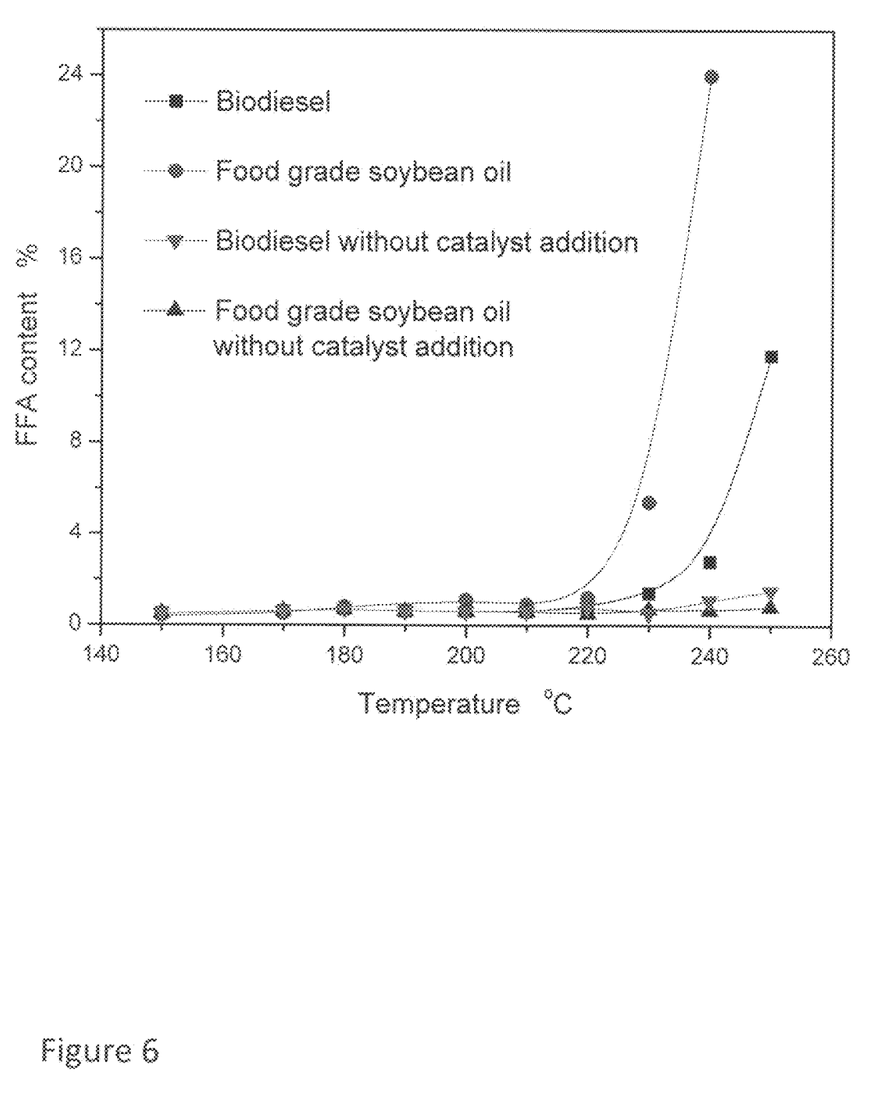
FIG. 6 is a graphical representation of the free fatty acids (FFA) content obtained upon the hydrolysis of biodiesel and soybean oil in both the presence of and in the absence of a Zn3La1 catalyst.

Since unrefined or waste oils generally contain a high content of water, the hydrolysis of biodiesel and oil are important side reactions that may decrease the overall yield of FAME, as well as increase the acidity of the reaction mixture. An increase in the acidity of the reaction mixture may decrease the longevity or lifetime of the manufacturing or production equipment. Referring now to FIG. 6, in the absence of a zinc and lanthanum mixed oxide catalyst, these hydrolysis reactions are not initiated even when the reaction temperature is elevated to 250° C. However, in the presence of a Zn3La1 catalyst, the hydrolysis begins to occur when the temperature exceeds 220° C. Since hydrolysis is not desirable, a reaction temperature that is lower than 220° C. is preferred for the production of a biodiesel product.

A high yield of FAME can be obtained when a catalyst prepared according to the teachings of the present disclosure and an oil feedstock that comprises a mixture of about 5 wt. % water in a waste oil are allowed to react at a temperature of 200° C. During the reaction, the water content present in the reactants can be maintained at about 5%. In this reaction mixture there is little to no occurrence of a hydrolysis reaction in regards to the biodiesel and triglycerides as shown in Equation 3.

$$R_1COOR_2 + H_2O \rightleftharpoons R_1COOH + R_2OH \qquad \text{Eq. 3}$$

FFA and water are usually considered as poisons to both homogeneous acidic and basic catalysts in traditional biodiesel production processes. However, the presence of FFA or water does not dramatically affect the zinc and lanthanum oxide catalyst system of the present disclosure. In fact, the addition of FFA (e.g., oleic acid) may actually accelerate the reaction rate and shorten the time to achieve a high yield of FAME. In comparison with conventional NaOH and $H_2SO_4$ catalyst systems, a zinc oxide and lanthanum oxide catalyst system exhibits an unexpected tolerance to the presence of FFA in the oil feedstock during the transesterification reaction. Thus, this class of metal oxide catalyst systems is uniquely suited for the direct conversion of acidic oils to a biodiesel product.

The presence of water in the reaction mixture has little effect on the yield of FAME obtained from a reaction mixture that uses the catalyst of the present disclosure. The addition of water to the reaction mixture may prolong the time to reach an equilibrium yield. However, when equilibrium is finally achieved, the overall yield of FAME will be greater than about 90% regardless of the water content. In comparison, the addition of water to reaction mixtures using conventional $H_2SO_4$ or NaOH catalysts shows a considerable effect on transesterification activity.

A novel catalyst system comprising zinc and lanthanum oxides as described in the present disclosure can actively catalyze the oil transesterification reaction when the temperature is greater than about 170° C., can actively catalyze FFA esterification when the temperature is greater than about 140° C., and can actively catalyze biodiesel and oil hydrolysis when the reaction temperature exceeds about 220° C. Thus, in order to obtain a high FAME yield, the reaction temperature is preferably maintained within the range of about 170 to 220° C. in order to enhance the simultaneous transesterification and esterification reactions, while limiting the occurrence of any hydrolysis reactions.

Figure 7:
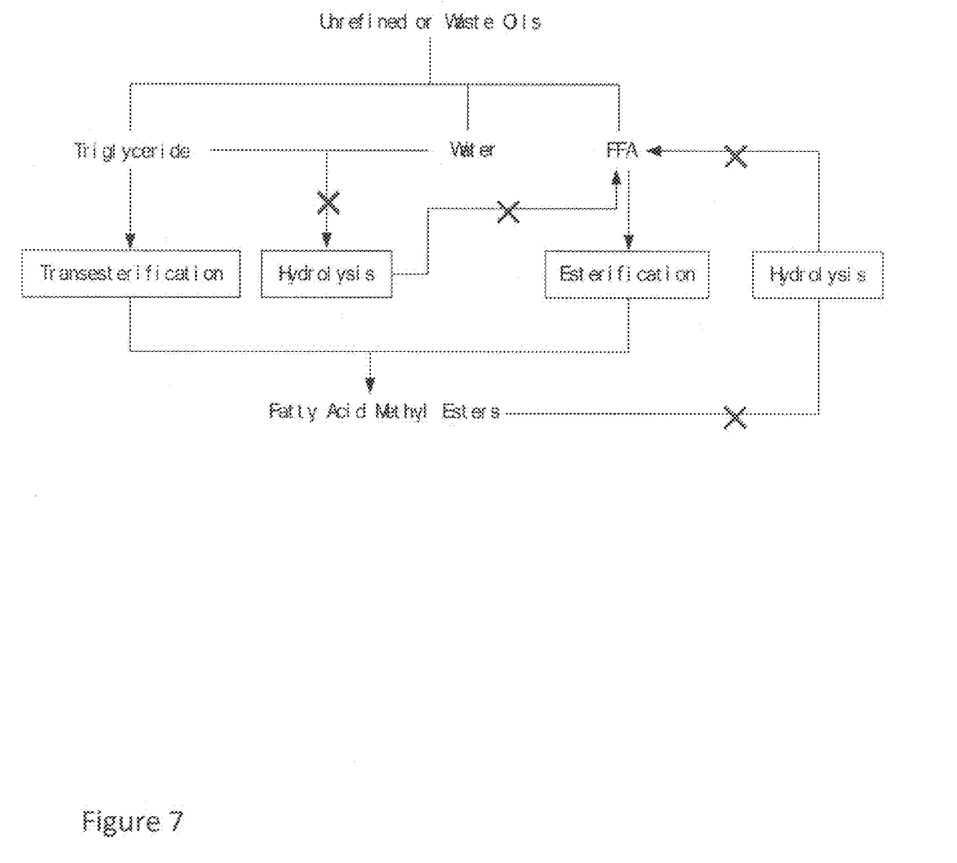
FIG. 7 is a schematic representation of the various reactions that may occur when using unrefined or waste oils as feedstock.

In FIG. 7, the possible reaction pathways that are enhanced and inhibited by the catalyst system of the present disclosure during the changing of unrefined and waste oils into biodiesel within the above described temperature range are shown. Biodiesel is formed through triglyceride transesterification and FFA esterification reactions and may be consumed through the occurrence of a FAME hydrolysis reaction. The occurrence of triglyceride hydrolysis will consume the raw material and increase the total acid number of the reactants, which can be harmful to reaction equipment. Under the reaction conditions of the present disclosure, the occurrence of FAME hydrolysis and triglyceride hydrolysis reactions are reduced or limited.

The reaction mechanism for the esterification reaction between the fatty acid and alcohol (e.g., methyl alcohol) is believed to include the interaction of the carbonyl oxygen of the fatty acids with the Lewis acidic site (L*) of the catalyst to form a carbocation. The nucleophilic attack of the alcohol on the carbocation produces an intermediate, which eliminates a water molecule to form a methyl ester. The reaction mechanism for the transesterification reaction between adsorbed methanol and triglyceride is believed to include the adsorption of the alcohol at the Lewis base site (B-) of the catalyst to form an oxygen anion. The nucleophilic attack of alcohol on the esters produces an intermediate from which a hydroxyl group is cleaved forming two esters. The presence of excess alcohol favors the occurrence of each reaction, thereby, maximizing the yield of FAME. One skilled-in-the-art will understand that other mechanisms for the esterification and transesterification reactions are also feasible.

Figure 8:
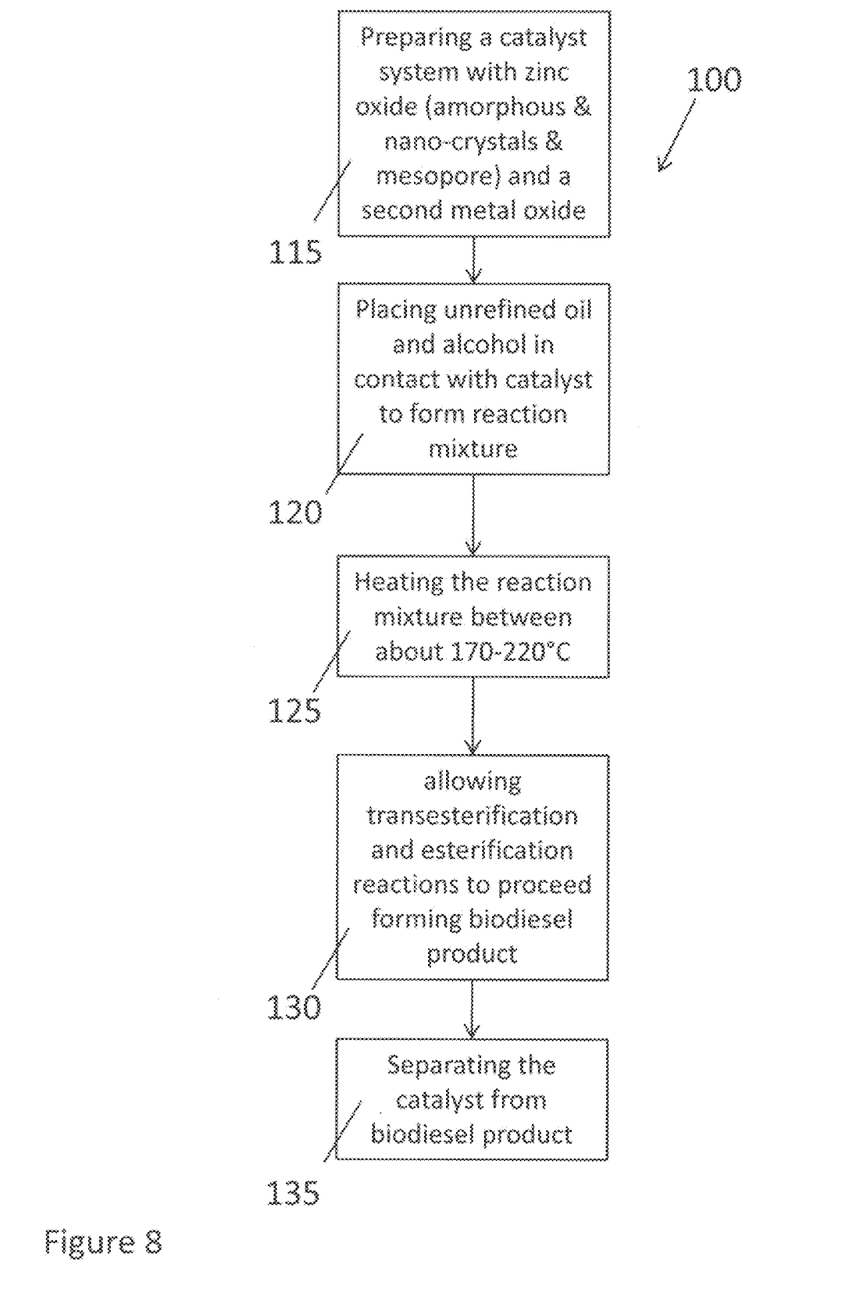
FIG. 8 is a flowchart describing a method for making a biodiesel product according to one embodiment of the present disclosure.

It is another objective of the present invention to provide a method of forming a biodiesel product from unrefined or waste oils. Referring now to FIG. 8, the method 100 comprises the steps of preparing 115 a heterogeneous catalyst system that comprises a mixture of zinc oxide and a second metal oxide; placing 120 an unrefined oil feedstock and an alcohol in contact with the catalyst system to form a reaction mixture, heating 125 the reaction mixture to a temperature that is between about 170° C. and 220° C.; allowing 130 the transesterification of triglycerides in the oil feedstock and the esterification of the fatty free acids in the oil feedstock to simultaneously occur for a predetermined amount of time to form fatty acid methyl esters resulting in a biodiesel product; and finally separating 135 the catalyst from the biodiesel product in order to collect the biodiesel product. The reaction mixture may include free fatty acids in a concentration that is greater than about 0.5 wt. % and water in a concentration that is greater than about 1 wt. % without having any detrimental effect on catalyst activity.

The step in the method of preparing 115 a heterogeneous catalyst system may use the method 10 as previously described above. More specifically, the catalyst may be formed by combining 15 together in a predetermined ratio, $Zn(NO_3)_2$ and $M(NO_3)_x$, where M is a second metal and x is an integer between 1 and 3, to form a $1^{st}$ aqueous solution; mixing 20 the $1^{st}$ solution with an aqueous solution of urea to form a mixed solution; agitating and heating 25 the mixed solution; stopping 30 the agitation after a substantial amount of precipitate forms; continuing 35 to heat the mixed solution until the solution becomes a firm solid; drying 40 the firm solid; and calcining 45 the solid to form the metal oxide catalyst system.

The heterogeneous catalyst system as used in the above method 100 of forming a biodiesel product may be a mixture of zinc oxide and a second metal oxide. The zinc oxide is a mixture of amorphous zinc oxide and zinc oxide nanocrystals, the zinc nanocrystals having a mean grain size between about 20 and 80 nanometers with at least one of the nanocrystals including a mesopore having a diameter of about 5 to 15 nanometers. The other or second metal oxide is preferably a mixture of lanathanum oxides that include a combination of $La_2CO_5$, and LaOOH. This combination of oxides preferably have a Zn:La bulk molar ratio between about 9.0:1.0 and 1.0:1.0.

The unrefined oil feedstock that is placed in contact with the catalyst system to form a reaction mixture may include an oil with a free fatty acid concentration that is greater than about 4 wt. % and/or a water concentration that is greater than about 3 wt. %. The ratio of alcohol to oil used to form the reaction mixture may be in a molar ratio that is greater than about 28:1. The alcohol is preferably methyl alcohol. The unrefined oil feedstock may be selected as one from the group of waste cooking oil, unrefined soybean oil, unrefined palm oil, food-grade soybean oil, and combinations or mixtures thereof.

The following specific example is given to illustrate the invention and should not be construed to limit the scope of the invention.

Example 1

Preparation of Metal Oxide Catalyst System

A catalyst system was prepared by first dissolving 266 grams of $Zn(NO_3)_2$ and 129 grams of $La(NO_3)_2$ in 600 milliliters of distilled water to form a $1^{st}$ aqueous solution. Then an aqueous urea solution was prepared by adding 600 grams of urea to 500 milliliters of water. The $1^{st}$ aqueous solution and the aqueous urea solution were then mixed together to form a mixed solution that was transparent and clear. The mixed solution was stirred or agitated with the stirrer set at a rate of 500 RPM. The mixed solution was also heated to a temperature that was near its boiling point.

The mixed solution was continued to be heated and stirred for several hours in which time the viscosity of the solution was observed to continually increase with some white precipitate being formed. When the white precipitate was observed to begin to melt or dissolve in the mixed solution, the agitation or stirring speed was reduced to about 50 to 150 RPM. When the mixed solution again became transparent, the stirring speed was increased to about 400 rpm and the heating of the solution continued. After a period of time, the white precipitate began to form for the second time. When a substantial amount of precipitate, e.g., about $\frac{1}{3}^{rd}$ of the total amount of precipitate, had formed in the mixed solution, the stirring or agitation was stopped.

The continual heating of the mixed solution was observed to cause the solution to become highly viscous in nature. The power of the heating source was adjusted to continue heating this viscous solution until a firm solid had formed. The firm solid material was then placed into an oven set at 120° C. for a period of about 4 hours to dry. The "dried" solid was then calcined at 450° C. for about 10 hours. During the calcination step, the volume of the solid was observed to increase about an order of magnitude, e.g., about a ten-fold increase. However, the measured weight of the solid over this same time period was observed to decrease by about 80%. The color of the resulting catalyst was observed to be yellow-white. For safety purposes, the door of the oven should be kept closed for at least the first two hours of the high temperature calcination. The preparation of the catalyst can be accomplished within about 15-20 hours.

This example describes the methodology used to prepare a zinc oxide and lanthanum oxide catalyst system according to the teachings of the present disclosure. The catalyst system as prepared above was used in the various reactions and characterization tests that are described throughout this disclosure.

A person skilled in the art will recognize that any measurements described in the present disclosure are standard measurements that can be obtained by a variety of different test methods. The test methods described in the example and the throughout the disclosure represent only one available method capable of obtaining each desired measurement.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A heterogeneous catalyst system comprising:
    a mixture of amorphous zinc oxide and zinc oxide nanocrystals, the zinc nanocrystals having a mean grain size between about 20 and 80 nanometers with at least one of the nanocrystals having a crystal face that includes a mesopore having a diameter of about 5 to 15 nanometers; and
    a lanthanum oxide,
    wherein the combination of the zinc oxide mixture and the lanthanum oxide exhibits a Zn:La bulk molar ratio between about 9.0:1.0 and 1.0:1.0 and having a first surface site and a second surface site, the first surface site capable of catalyzing a transesterification reaction of triglyceride with an alcohol and the second surface site capable of catalyzing a esterification reaction of a fatty acid with an alcohol.

2. The catalyst system of claim 1, wherein the lanthanum oxide is selected from the group consisting of $La_2CO_5$, LaOOH, and combinations or mixtures thereof.

3. The catalyst system of claim 2, wherein the zinc oxide is highly dispersed with the lanthanum oxide and interacts therewith.

4. A heterogeneous catalyst system comprising:
    zinc oxide nanocrystals, the zinc oxide nanocrystals having a mean grain size between about 20 and 80 nanometers with at least one of the nanocrystals having a crystal face that includes a mesopore having a diameter of about 5 to 15 nanometers; and
    a second metal oxide, the second metal oxide being a lanthanum oxide;
    wherein the combination of the zinc oxide nanocrystals and the second metal oxide is capable of catalyzing both a transesterification reaction of a triglyceride with an alcohol and a esterification reaction of a free fatty acid with an alcohol.

5. The heterogeneous catalyst system of claim 4, wherein the lanthanum oxide is selected from the group consisting of $La_2CO_5$, LaOOH, and combinations or mixtures thereof.

6. The heterogeneous catalyst system of claim 4, further comprising amorphous zinc oxide.

7. A method of preparing a heterogeneous catalyst system, the method comprising:
    combining in a predetermined ratio, a Zn salt and a second metal salt, to form a first aqueous solution mixing the first aqueous solution with an aqueous urea solution to form a mixed solution;
    agitating and heating the mixed solution until a substantial amount of solid precipitate forms in the mixed solution;
    continuing to heat the mixed solution until the solution becomes a firm solid;
    drying the firm solid at a temperature greater than about 100° C. for a period of time of at least about 1 hour; and
    calcining the solid at an elevated temperature for a predetermined length of time to obtain a heterogeneous catalyst system comprising:
    a mixture of amorphous zinc oxide and zinc oxide nanocrystals, the zinc nanocrystals having a mean grain size between about 20 and 80 nanometers with at least one of the nanocrystals having a crystal face that includes a mesopore having a diameter of about 5 to 15 nanometers; and
    a lanthanum oxide,
    wherein the combination of the zinc oxide mixture and the lanthanum oxide exhibits a Zn:La bulk molar ratio between about 9.0:1.0 and 1.0:1.0 and having a first surface site and a second surface site, the first surface site capable of catalyzing a transesterification reaction of triglyceride with an alcohol and the second surface site capable of catalyzing a esterification reaction of a fatty acid with an alcohol.

8. The method for preparing a heterogeneous catalyst of claim 7, wherein the second metal salt comprises $La(NO_3)_2$.

9. The method for preparing a heterogeneous catalyst of claim 7, wherein the step of calcining the solid at an elevated temperature for a predetermined length of time is done at a temperature of at least about 450° C. for about 10 hours.

10. The method for preparing a heterogeneous catalyst of claim 7, wherein the step of calcining the solid at an elevated temperature results in about a ten-fold increase in the volume of the catalyst and about an 80% decrease in the weight of the catalyst.

11. A method comprising the steps of:
providing a heterogeneous catalyst system, the catalyst system comprising:
a mixture of amorphous zinc oxide and zinc oxide nanocrystals, the zinc nanocrystals having a mean grain size between about 20 and 80 nanometers with at least one of the nanocrystals having a crystal face that includes a mesopore having a diameter of about 5 to 15 nanometers; and a lanthanum oxide,
wherein the combination of the zinc oxide mixture and the lanthanum oxide exhibits a Zn:La bulk molar ratio between about 9.0:1.0 and 1.0:1.0 and having a first surface site and a second surface site, the first surface site capable of catalyzing a transesterification reaction of triglyceride with an alcohol and the second surface site capable of catalyzing a esterification reaction of a fatty acid with an alcohol;
placing a feedstock and an alcohol in contact with the catalyst system to form a reaction mixture, the feedstock including triglycerides, free fatty acids in a concentration that is greater than about 0.5 wt. % and water in a concentration that is greater than about 1 wt. %;
heating the reaction mixture; and
allowing the catalyzed transesterification of the triglycerides and the catalyzed esterification of the free fatty acids to simultaneously occur for a predetermined amount of time to form the respective corresponding alcoholic esters of the triglycerides and the free fatty acids.

12. The method of claim 11, wherein the free fatty acid concentration is greater than about 4 wt. %.

13. The method of claim 11, wherein the water concentration is greater than about 3 wt. %.

14. The method of claim 11, wherein the corresponding alcoholic ester of the free fatty acids has a greater than about 90% yield.

15. The method of claim 14, wherein the 90% yield is obtained after a period of time in which the amorphous zinc oxide and second metal oxide of the catalyst system partially leach into the reaction mixture;
wherein the leaching of the amorphous zinc oxide and second metal oxide into the reaction mixture exposes the surface of the zinc nanocrystals in the catalyst system to the reaction mixture.

16. The method of claim 11, wherein the alcohol to feedstock molar ratio is greater than about 28.

17. The method of claim 11, wherein the feedstock is selected from the group consisting of waste cooking oil, unrefined soybean oil, unrefined palm oil, food-grade soybean oil, and combinations or mixtures thereof.

18. The method of claim 11, wherein the reaction mixture is heated to a temperature that is between about 170° C. and 220° C.

* * * * *